Oct. 18, 1955 O. A. KERSHNER ET AL 2,720,943
MECHANICALLY-OPERATED DISC BRAKE
Filed Dec. 20, 1951 4 Sheets-Sheet 4
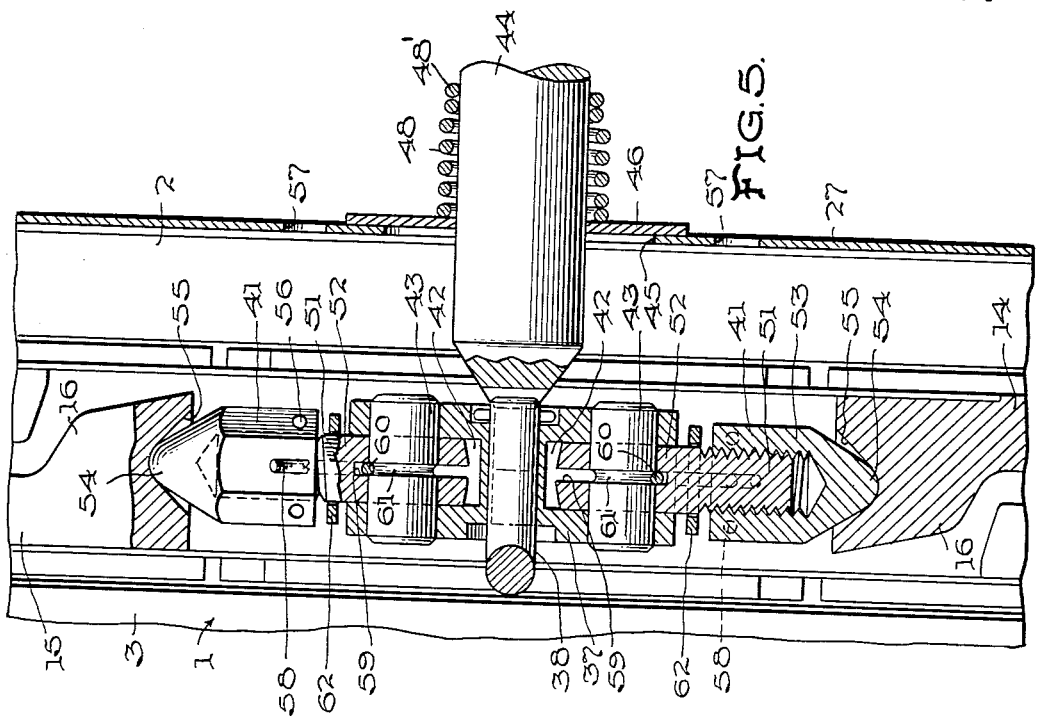
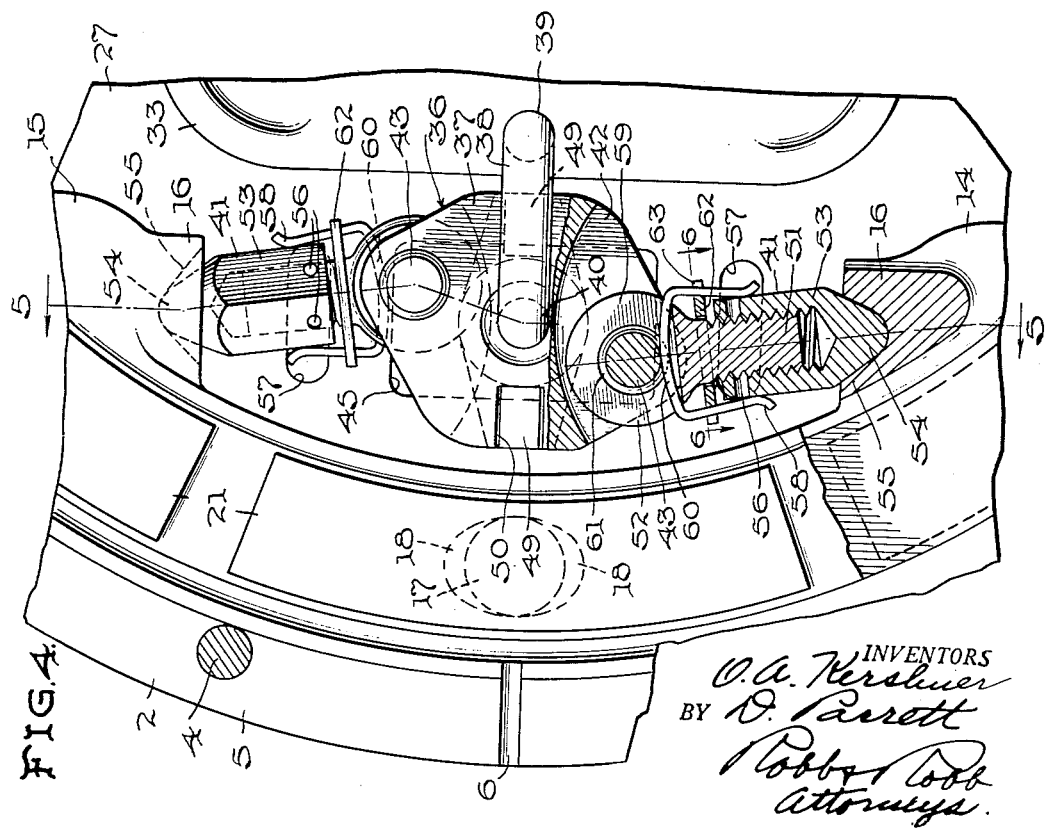
INVENTORS
O. A. Kershner
BY D. Parrott
Robby Cobb
Attorneys.

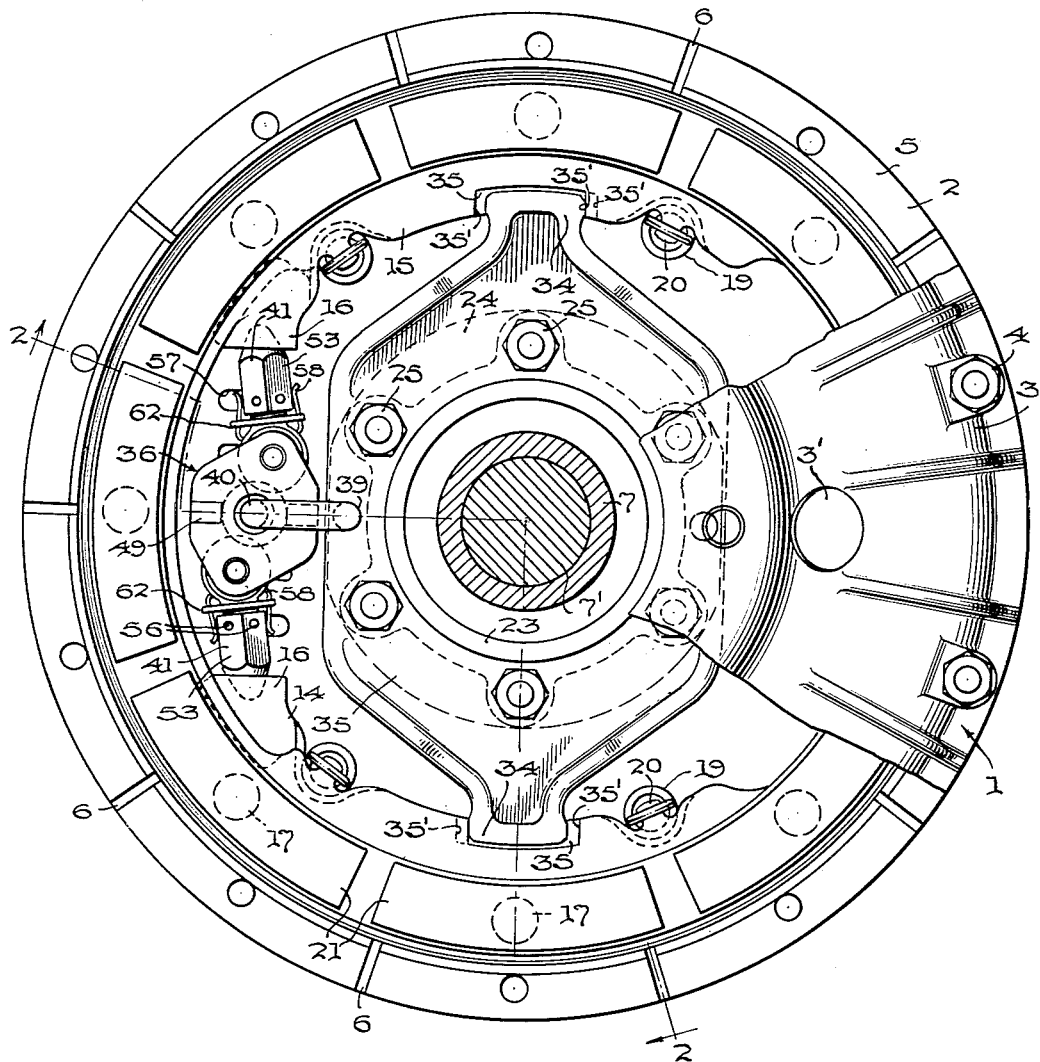

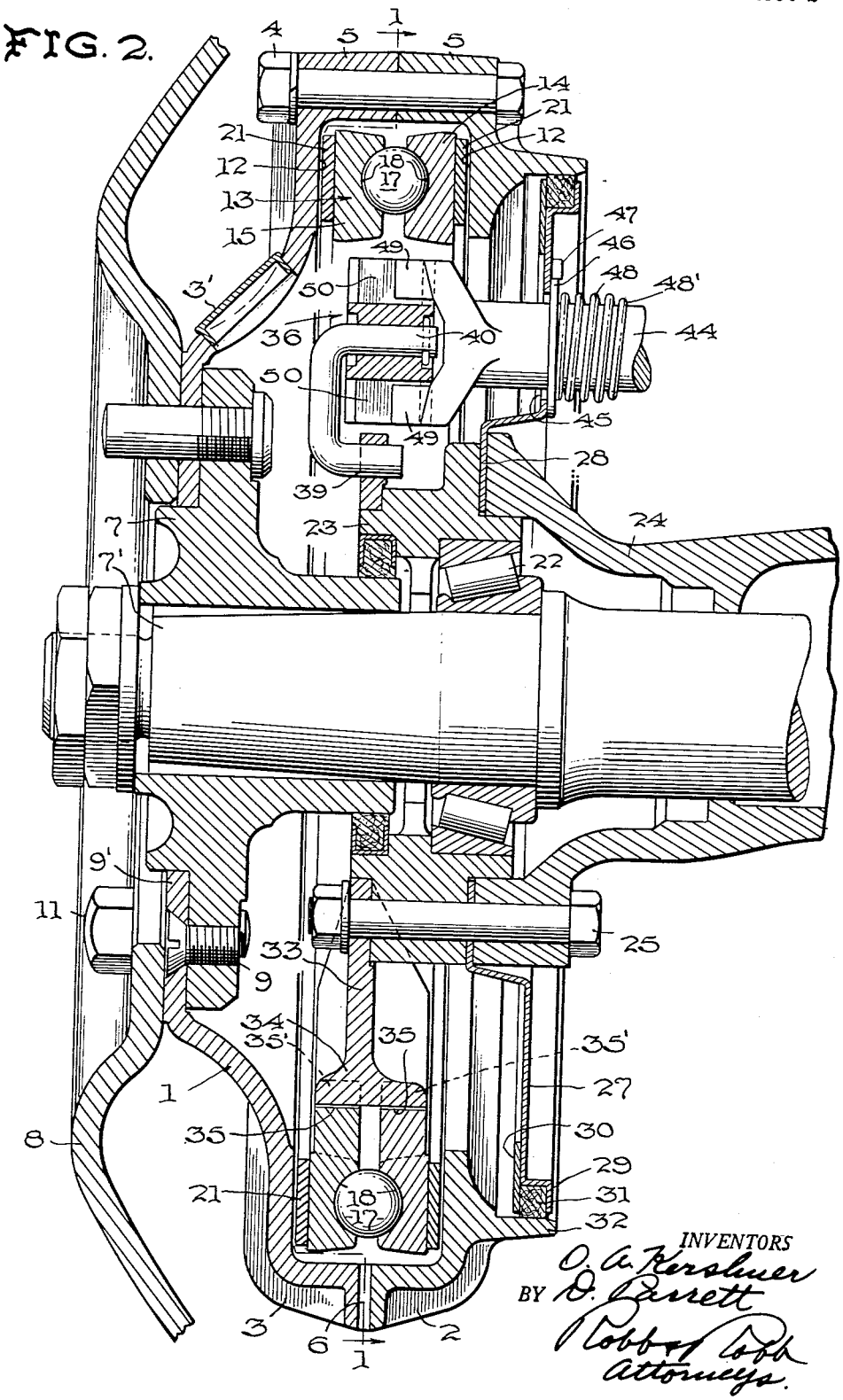

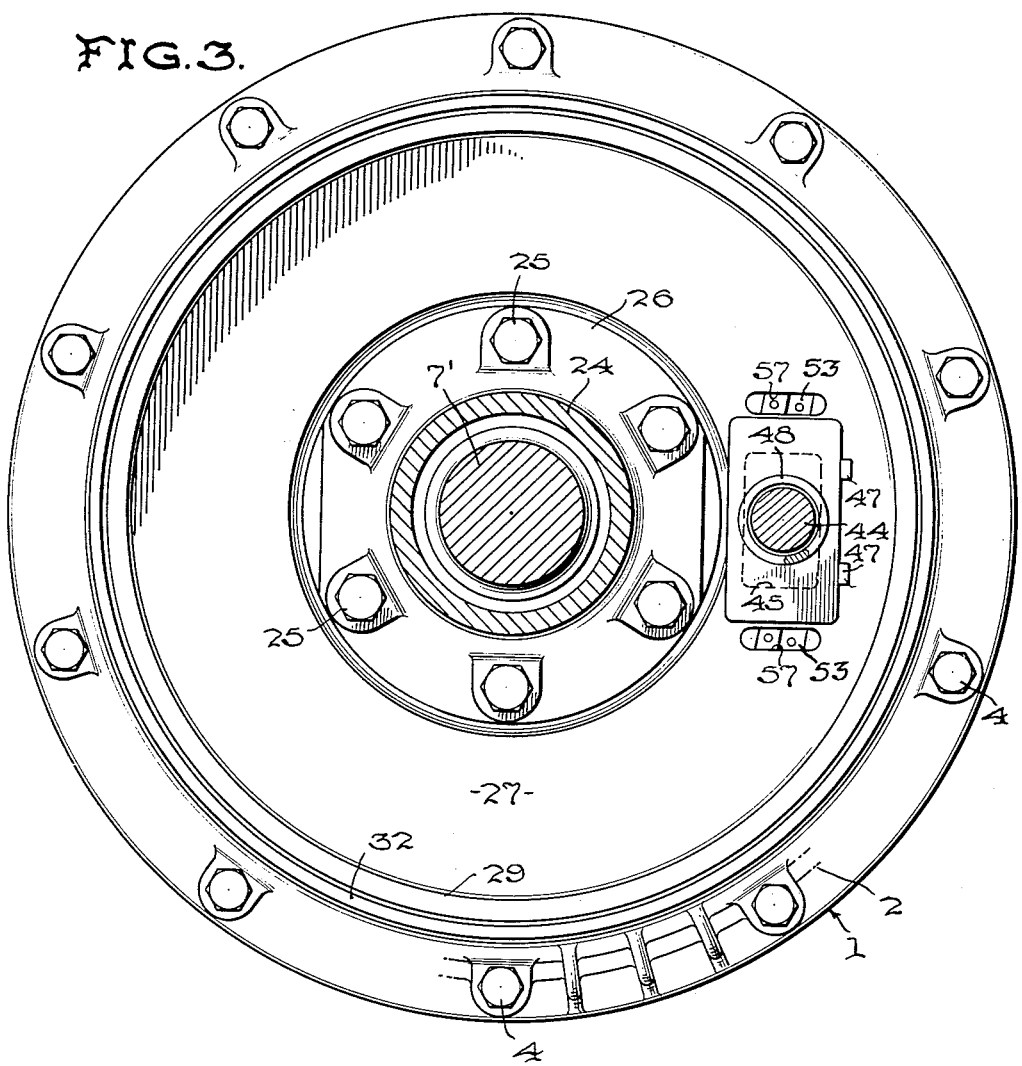
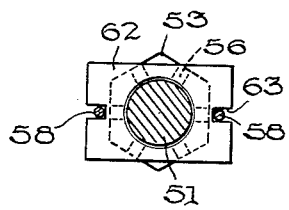

United States Patent Office 2,720,943
Patented Oct. 18, 1955

2,720,943

MECHANICALLY-OPERATED DISC BRAKE

Osborn A. Kershner and Dent Parrett, St. Joseph, Mich., assignors, by mesne assignments, to Lambert Brake Corporation, St. Joseph, Mich., a corporation of Michigan Application December 20, 1951, Serial No. 262,548

8 Claims. (Cl. 188—72)

The present invention relates to mechanically operated disc brakes, and more particularly to mechanically operated disc brakes which are especially suited for use in connection with the traction or drive wheels of tractor vehicles and the like, but which are not limited to such use.

In many types of tractor vehicles, it is desirable to have brakes, particularly for the traction wheels, which are relatively inexpensive, yet strong, durable and susceptible of rapid and simple service or replacement of the parts of the brake mechanism. Moreover, it is desirable that these brakes be powerful in their braking action, since frequently, the brakes on the drive or traction wheels of these tractors are utilized as steering brakes by partially braking or locking the drive wheel on one side of the tactor, while the driving action of the other drive wheel is continued to thus utilize the braked wheel as a pivot for the tractor.

Therefore, it is the primary object of the present invention to provide a wheel brake for tractors or the like having the aforementioned characteristics, but which is also subject to other uses.

Another object is to provide a disc brake for tractor wheels or the like, which attains the aforementioned characteristics by the utilization of a novel combination and arrangement of parts, comprising a rotary housing adapted to be mounted on a conventional wheel-mounting flange of a vehicle drive axle, or on any other rotary part to be braked, a relatively stationary inner double-disc friction unit being concentrically mounted within the housing, with the discs of the double-disc unit adapted to be spread axially apart into frictional engagement with the rotary housing responsive to mechanical actuator means cooperatively engaged with the discs, with a powerful, self-energizing or "servo" action.

A further object is to provide a novel mechanical brake actuator which is particularly adapted for use in a disc brake of the above-described type, this actuator being so constructed as to apply thrusts in opposite directions on the respective discs of the inner disc unit, but which allows one of the discs to be shifted in a direction opposed to the thrust applied thereto when the disc initially engages the rotary housing to be braked, in order to allow the servo action of the brake to be effective, irrespective of the direction of rotation.

Still another object is to provide a mechanical brake actuator which attains the foregoing objective by being pivotally connected to a stationary part of the brake assembly so as to be bodily shiftable in the direction of rotation of the rotary housing, while continuing to exert its thrusts tending to rotate the discs relative to each other.

A still further object is to provide a mechanical brake actuator according to the foregoing objectives, having simple and readily adjustable means for adjusting the release or running clearance between the opposed friction surfaces of the rotary housing and inner disc unit, whereby the brake may be readily and easily maintained in proper and most effective operative condition.

Another object is to provide a disc brake of the inner double-disc type, having a mechanical actuator including a rockable member and a pair of thrust members pivotally connected to the respective opposite ends of said rockable member and operatively engaged with the brake discs for actuating the brake responsive to rocking movements of said rockable member.

Still another object is to provide a disc brake in accordance with the foregoing paragraph, wherein the rockable member is pivotally anchored on a stationary support in such a manner as to be bodily shiftable relative to said support to permit servo-actuation of the brake.

Other objects and advantages of this invention will be hereinafter described, and the novel features thereof defined in the appended claims.

In the drawings:

Fig. 1 is a view of the brake assembly in vertical section, as generally taken substantially on the line 1—1 of Fig. 2, with a representative portion of the outboard side of the brake housing shown in elevation and the remainder of the housing being broken away to better reveal the interior features, including the actuator means;

Fig. 2 is an enlarged sectional view as taken substantially on the line 2—2 of Fig. 1, and the brake being shown in conjunction with a portion of a typical vehicle wheel and its supporting axle;

Fig. 3 is a view in side elevation showing the inboard side of the brake assembly, with the conventional vehicle axle housing and axle and the actuator shaft all shown in section;

Fig. 4 is an enlarged view of a segment of the brake assembly, with the outboard housing section broken away to expose the actuator mechanism, and certain of the actuator parts being broken away and shown in section;

Fig. 5 is a sectional view, as taken on the line 5—5 of Fig. 4, with certain of the parts shown in elevation; and Fig. 6 is a sectional view through one of the thrust members of the actuator, as taken on the line 6—6 of Fig. 4.

Like reference characters designate corresponding parts in the several views of the drawings.

Referring first to Figs. 1, 2 and 3, it is seen that the brake of this invention generally comprises a two-part housing or casing 1 having an inboard section 2 and an outboard section 3 suitably secured together by bolts 4 extending through abutting marginal flanges 5 on each section of the housing. In order to prevent the collection of water or other foreign matter in the housing, the abutting edges are preferably provided with a plurality of radially disposed drain grooves, as generally indicated at 6. The housing 1 is adapted to be mounted on a conventional wheel-mounting hub or flange 7 which supports a vehicle wheel, a portion of said wheel being shown in Fig. 2 and designated 8. As is best seen in Fig. 2, the hub 7 is mounted on the outer end of the vehicle axle 7' for rotation therewith, in a conventional manner. Preferably, the housing 1 is secured to the mounting flange 7 by means of a plurality of annularly spaced, countersunk screws 9, or the like, engaged with a radially disposed flange portion 9' of the outboard housing section 3, and the housing 1 is centered or positioned by the conventional pin or stud 10 carried by the flange 7 for properly locating the vehicle wheel prior to securing the same to the flange or hub 7 by means of conventional stud bolts 11. These bolts 11 pass through the flange 9' of the housing section 3, and thus further strengthen the connection between the housing 1 and the hub 7. Now it is seen that the housing 1 is carried by the wheel-mounting hub 7, so as to be rotatable with the wheel 8, and braking of the housing 1 will therefore control the rotation of the wheel 8.

The inner faces of the housing include opposed, annular friction surfaces 12 adapted for cooperative braking engagement with an inner double-disc unit or assembly, generally designated 13. This double-disc assembly preferably comprises a pair of similar discs 14, 15 disposed in back-to-back relation, and constituting the inboard disc and outboard disc, respectively, and each disc having an offset lug 16, said lugs being disposed substantially on the median plane of the inner double-disc assembly (see Fig. 5).

Interposed between said discs is a plurality of hardened balls 17, said balls seating in oppositely disposed and oppositely inclined, ramped seats 18 formed in the inner faces of the discs 14, 15. A plurality of tension springs 19, engaged at their opposite ends on radially disposed pins or projections 20, connect the two discs 14, 15 together, thus holding the balls therebetween, the force of the springs 19 causing the discs to assume a normal position, with the balls 17 seating in the deepest part of the ramped seats 18, as limited by the actuator means which will hereinafter be described.

As is customary in this general type of disc brake, the outer annular faces of the discs 14 and 15 are preferably provided with a suitable number of friction lining segments or facings 21, these lining segments being bonded or otherwise suitably secured to the discs in opposed relation to the friction surfaces 12 of the housing 1.

Conventionally, in many types of tractors and other vehicles, the drive axle thereof is supported in a manner comparable to the manner shown in the drawings, with particular reference to Fig. 2, wherein a roller bearing 22 is seated on the tapered end of the axle 7'. The bearing 22 is locked in position on the axle 7' by a retaining ring 23 which engages the outer race of the bearing 22, this retaining ring 23 being secured to the axle housing 24 of the vehicle by means of a plurality of through bolts 25. The bolts 25 pass through a flange 26 on the end of the axle housing and through the bearing retaining ring 23.

A closure plate 27 for the inboard section 2 of the housing 1, is provided with an annular flange 28, adapted to be clamped between the flange 26 of the axle housing and the ring 23, this flange 28 defining a central opening through the plate 27 through which the axle 7' projects. The through bolts 25 pass through the flange 28, and said plate 27 is thus rigidly secured to the axle housing, so as to remain stationary. The outer marginal edge of the cover plate 27 is provided with an offset flange portion 29, and an annular member 30 is suitably secured to the plate 27 in opposed relation to the flange 29 to provide a peripheral seat for a sealing felt or gasket 31 which is sealingly engaged with the inner face of an adjacent flange 32. It is the purpose of the seal 31, in conjunction with the closure or cover plate 27, to seal the inboard side of the housing 1 against the entry of dirt and/or water which would otherwise interfere with the efficient operation of the inner double-disc assembly 13.

With particular reference to Figs. 1 and 2, it is seen that the bolts 25 also pass through a support 33 for the inner disc assembly 13 for fixing the support 33 on the stationary bearing-retaining ring 23. This support 33, in the illustrative embodiment, comprises a spider-like member having a pair of oppositely projecting disc-supporting lugs 34, these lugs 34 being of sufficient width as to substantially span the width or thickness of the double-disc assembly 13 (see Fig. 2).

The discs 14, 15 of the inner disc assembly each have a seat 35 extending radially outwardly from the inner periphery thereof, these seats being of a length between their ends 35', 35' in excess of the length of the lugs 34 on the support 33, so as to allow the inner disc assembly 13 to rotate slightly in the direction of rotation of the housing 1, as may be required in the braking operation, and as will be hereinafter more particularly described.

The actuating means for the brake assembly thus far described, comprises toggle means generally denoted at 36. The toggle means 36 preferably comprises a central rockable member or block 37 which is pivotally connected to an adjacent portion of the stationary support 33 by a U-shaped connecting link 38. This link 38 has one of its parallel arms pivotally connected or mounted in the support 33, as at 39, and the other arm thereof is pivotally connected or mounted in the rockable block 37, as at 40. The axis of the pivotal connection 40 is located substantially on a line longitudinally bisecting the block 37, i. e., on a vertical line through the block 37, as viewed in Figs. 1, 4 and 5. A pair of thrust arms or members 41 are pivotally connected to the respective opposite ends of the block 37, and the pivotally connected ends of the arms 41 and the block 37 are preferably complemental to each other, as best seen in Figs. 4 and 5. In the preferred form, the opposite ends of the block 37 are bifurcated, as at 42, and the ends of the thrust arms 41 are seated in the respective recesses in the ends of the block and pivotally connected to the block 37 by means of pivot pins 43.

As best seen in Fig. 4, the thrust arms 41 are pivotally connected with the block 37 on opposite sides of the aforementioned vertical line bisecting the block 37, and their free ends are operatively engaged with the lugs 16 on the respective discs 14 and 15. Accordingly, counter-clockwise rocking of the block 37 will tend to swing the pivotal axes of the pivot pins 43 in opposite directions about the axis on which the block 37 is pivoted, thereby causing a thrust to be transmitted through the arms 41 against the lugs 16 of the discs 14, 15, said thrust tending to rotate the discs relative to each other, much in the manner of a toggle.

Rocking movements are preferably imparted to the block 37 by means of a brake shaft 44 which extends into the brake housing through an opening 45 through the cover plate 27. The brake shaft 44 may be operated by the conventional brake pedal (not shown) of a tractor or other vehicle, as the case may be, or in any other desired manner. Due to a typical operative characteristic of disc brakes of the general type here involved, the opening 45 through the plate 27 is elongated, so as to permit the brake shaft 44 to shift slightly in a vertical direction as seen in Figs. 1, 3, 4 and 5, along with bodily shifting movements of the block 37 responsive to actuation of the brake. A cover plate 46 is mounted on the shaft 44 for covering the opening 45 in plate 27, this plate 46 being of sufficient size relative to the opening 45 as to always completely close the opening 45 when the shaft 44 is bodily shifted as aforesaid. The plate 46 is maintained in registered relation to the opening 45 by any suitable means, such as locating or positioning lugs 47 (see Fig. 3) on the outer surface of the closure plate 27. A compression spring 48, encircling the shaft 44 and preferably tapered at its outer end so as to frictionally engage the shaft 44, as at 48', in order to fix the spring on shaft 44, urges said plate 46 into engagement with the plate 27. However, any other suitable means may be utilized to back up the spring 48, if preferred.

The end of the shaft 44 which is adapted to impart rocking movements to the block 37 is preferably forked so as to provide spaced arms 49 adapted to be engaged in opposed grooves or slots 50 in opposite sides of the block 37. Thus, it is apparent that rocking movements of the shaft will impart corresponding rocking movements to the block 37, thereby effecting the aforementioned toggle action.

As noted hereinbefore, there is a unique action in brakes of this general type, and this action is due to the servo-action or self-energizing action thereof. In operation, when the brake shaft 44 is rocked in a counter-clockwise direction, thus rocking the block 37, the thrust members 41 will impart relative rotative movements to the discs 14 and 15. Responsive to this relative rotation, the balls 17 will ride up the oppositely inclined ramps 18 of the discs, thus spreading the discs axially apart into initial frictional engagement with the rotary housing to be braked. Upon this initial engagement, the entire inner disc unit will slightly rotate or "clock" in the direction of rotation of the housing, either in a clockwise or counter-clockwise direction, as the case may be. This clocking motion of the inner disc assembly will accordingly bodily shift the actuator means, as permitted by the pivotal connections 39 and 40. However, assuming the housing to be rotating in a counter-clockwise direction, as viewed in Figs. 1 and 4, clocking movement of the outboard disc 15 will be limited by abutment of one end 35' of the opposed seats 35 of the disc 15 with the supporting lugs 34 of the stationary support 33, and the discs will assume the positions shown in Fig. 1, with the outboard disc 15 held relatively stationary. It will also be seen that the ends 35' of seats 35 of the inboard disc 14, shown in dotted lines in Fig. 1, are still spaced from the stop 34, so that the disc 14 is free for limited rotation in a counter-clockwise direction. Further rocking of the block 37 in a counter-clockwise direction will shift all of the relative rotative movement of the discs 14 and 15 over to the inboard disc 14 by virtue of the block 37 rocking on the pivot 49 and shifting bodily still further in the direction of rotation of the disc 14. As a result of this further rotative movement of the disc 14 relative to the disc 15, the balls 17 will spread the discs further apart in an axial direction responsive to the torque applied to the inboard disc 14 by the rotary housing, and the braking action will be greatly increased in the manner of a servo-action.

Thus it is seen that the balls 17, riding up the ramps 18, responsive to the torque imparted to the relatively rotatable disc 14 or 15, depending on the direction of rotation of the vehicle wheel, apply a substantial portion of the braking force to the discs, and therefore, the pressure that the operator is required to apply to the aforementioned brake shaft 44 by a pedal or other member is relatively slight, as compared with the powerful braking action attained.

For maintaining a proper running or release clearance between the friction surfaces 12 of the housing and the cooperative friction surfaces of the inner disc assembly, the thrust arms 41 are each preferably formed as a pair of complementally interengaged, axially adjustable members. In the illustrative embodiment, the thrust members 41 each comprise a screw threaded shank 51 having an eye portion 52 disposed in the bifurcated ends 42 of the block 37 and pivotally mounted on the pivot pins 43. Threadedly engaged with the shank 52 for axial adjustment relative thereto is a hexagonal or other appropriately shaped thrust head 53 having a rounded nose 54 seated in a conical seat 55 in the respective thrust-receiving lugs 16 on the discs 14, 15 of the inner double-disc assembly 13.

Now it is seen that the thrust members or arms 41 may be axially adjusted so as to be properly engaged with the thrust-receiving lugs 16 on the respective discs 14, 15, and as the friction linings 21 wear down, as the result of continued usage, the operative length of the thrust arms 41 may be increased. Such increased length of the thrust arms 41 will maintain the discs 14 and 15 rotatively displaced relative to each other a corresponding distance, thus preventing the balls 17 from rolling down to the bottom of the ramps 18, and the discs are therefore held in a partly spread position, with the friction linings 21 in relatively close relation to the friction surfaces 12 of the housing 1, that is, with sufficient release or running clearance therebetween. Progressive wear of the friction linings 21 may therefore be readily compensated for by progressive lengthening of the thrust arms 41.

To facilitate such progressive adjustment of the discs 14, 15, the thrust heads 53 are each provided with a plurality of tool-receiving openings 56 radially extended inwardly, in circumferentially spaced relation. In the illustrative embodiment, the thrust heads 53 are shown as being hexagonal in section, and therefore there are shown six openings 56, one extending inwardly from each face of the heads 53. Ready access to the adjusting means is preferably provided for by a pair of spaced openings 57 through the cover plate 27, through which a suitable tool adapted to fit the openings 56 may be inserted for rotating the heads 53.

Means is also provided for locking the thrust heads 53 in adjusted positions relative to their respective shanks 51, said locking means comprising a substantially U-shaped spring 58. This U-shaped spring 58 also has the function of a key for locking the pivot pins 43 in the bifurcated ends 42 of the block 37. As is best seen in Figs. 4 and 5, the eye portion 52 of each shank member 51 is bifurcated so as to provide a recess 59 into which the base 60 of the U-shaped spring 58 is inserted during assembly of the arms 41 with the bifurcated ends 42 of the block 37. The pivot pins 43 are each provided with a centrally located annular groove 61 in which the base 60 of the spring 58 seats, thus forming a locking key for retaining the pivot pins 43 in place, and the arms of the U-shaped springs 58 extend longitudinally of the thrust members 41 and engage the flat faces of the thrust heads 53, thus resiliently restraining or locking the heads 53 against inadvertent rotation relative to the shanks 51, thereby assuring that the inner discs 14, 15 of the inner disc assembly 13 will remain in any selected position of adjustment relative to the friction surfaces 12 of the housing 1. It is to be understood however, that the locking force of the springs 58 on the thrust heads 53, while being sufficiently strong for the above described function, may be readily overcome by the utilization of a suitable tool for rotating the heads 53 as aforesaid.

Any suitable means may be provided for retaining the arms of the springs 58 in proper contacting relation to the thrust heads 53. In the illustrative embodiment, such means comprise an oblong washer 62 carried on the shank 51 of each adjustable arm 41. Each washer 62 has a pair of opposite, centrally disposed, marginal notches or spring receiving slots 63, in which the arms of the springs 58 seat (see Fig. 6) for retaining the spring 58 against lateral displacement, i. e., pivotal movement about the base portion 60 thereof.

In order to facilitate observation and/or lubrication of the toggle means 36 or for facilitating observation of the general condition of the inner double-disc assembly 13, the outboard section 33 of the housing 1 is preferably provided with a suitable number of capped sight openings, as generally denoted at 3', see Figs. 1 and 2.

While the brake of this invention is not limited solely to use with tractor vehicles, it is particularly well-suited for such use by reason of not having any protuberances or actuating parts on the outer periphery of the brake.

Now it is apparent to those skilled in the art that the objects of this invention have been fully attained by virtue of the specific construction and combination of elements herein described and illustrated in detail. However, the invention is not limited to such specific construction, since changes and alterations may be resorted to, without departing from the spirit thereof as defined in the appended claims.

We claim:

1. A friction brake of the class described, comprising a rotary member to be braked having opposed friction surfaces, a relatively stationary braking unit including a pair of annular discs having friction surfaces engageable with the friction surfaces of said rotary member, stationary supporting means for said braking unit, said discs encircling said supporting means and having bearing surfaces in supporting contact therewith, camming means for spreading said discs axially apart into braking engagement with said rotary member responsive to relative rotative movements of said discs, a mechanical actuator for imparting said relative rotative movements to said discs, stop means for limiting rotation of one of said discs with the rotary member upon initial braking engagement therebetween, while allowing the other disc to rotate slightly in the direction of rotation of said rotary member, said actuator including toggle means engaged with the respective discs of said braking unit, and means including a link pivotally connected with said toggle means and pivotally mounted on said stationary supporting means for shiftably supporting said toggle means on the stationary supporting means for bodily shifting movements relative to said stationary supporting means in the direction of rotation of said rotary member responsive to slight rotation of one of said discs as aforesaid.

2. A friction brake as defined in claim 1, wherein the link has its opposite ends disposed in parallel relation to each other, said toggle means being pivotally mounted on one of the ends of said link, and the opposite end of said link being pivotally connected with said stationary supporting means.

3. A friction brake as defined in claim 1, wherein the toggle means comprises a rockable member, and a pair of thrust members pivotally connected to said rockable member and operatively engaged with the respective discs of said braking unit, said link being pivotally connected with said rockable member.

4. A friction brake as defined in claim 1, wherein the toggle means comprises a rockable member and a pair of thrust members pivotally connected to said rockable member and operatively engaged with the respective discs of said braking unit, said link being pivotally connected with said rockable member, one end of each thrust member being complemental to the adjacent end of said rockable member, one of said complemental ends aforesaid being bifurcated, the complemental end of the other member being disposed in the bifurcation of the first, and means pivotally connecting said complemental ends.

5. A friction brake as defined in claim 1, wherein the toggle means comprises a rockable member, a pair of thrust members, each of said thrust members being pivotally connected at one of its ends to one end of said rockable member, a pivot pin extending through the pivotally connected ends of said members, each of said thrust members being axially adjustable, and means for locking said pivot pin in place, said last mentioned means also having means engaged with said thrust members for locking the same in a selected axially adjusted position.

6. A friction brake as defined in claim 1, wherein the toggle means comprises a rockable member, a pair of thrust members, each of said thrust members being pivotally connected at one of its ends to one end of said rockable member, a pivot pin extending through the pivotally connected ends of said members, each of said thrust members being axially adjustable, resilient means engaged with each of said thrust members for locking the same in adjusted position, and means for retaining said resilient means in engagement with the thrust members, while permitting said thrust members to be axially adjusted.

7. A mechanical brake actuator device of the class described, comprising a rockable member, supporting means including a member pivotally connected to said rockable member and having a portion adapted to be pivotally mounted on a stationary support, for rockably and bodily shiftably supporting said rockable member, thrust members pivotally connected at the opposite ends of said rockable member, and means for varying the length of said thrust members.

8. A mechanical brake actuator as defined in claim 7, wherein a pivot pin connects said thrust members to said rockable member, said thrust members each comprising a pair of screw-threadedly inter-engaged members, and means engageable with one of said screw-threaded members for locking the same against rotation relative to the other member, said last mentioned means also being engaged with said pivot pin and constituting a key for retaining said pivot pin in place.

References Cited in the file of this patent

UNITED STATES PATENTS

| | | |
|---|---|---|
| 1,046,495 | Royce | Dec. 10, 1912 |
| 2,177,372 | Milan | Oct. 24, 1939 |
| 2,279,274 | Johnson et al. | Apr. 7, 1942 |
| 2,387,039 | Parrett | Oct. 16, 1945 |
| 2,555,651 | Lambert et al. | June 5, 1951 |
| 2,587,831 | Frick | Mar. 4, 1952 |